Patented Mar. 5, 1929.

1,704,456

UNITED STATES PATENT OFFICE.

WILLIAM R. BARGER, OF PASADENA, CALIFORNIA, ASSIGNOR TO THE GOVERNMENT AND THE PEOPLE OF THE UNITED STATES OF AMERICA.

PROCESS FOR THE TREATMENT OF FRUIT FOR THE PREVENTION OF DECAY.

No Drawing.   Application filed November 14, 1927. Serial No. 233,302.

(GRANTED UNDER THE ACT OF MARCH 3, 1883.)

This application is made under the act of March 3, 1883, Chapter 143, (22 Stat. 625) and the invention herein described and claimed may be used by the Government of the United States or any of its officers or employees in the prosecution of work for the Government, or any person in the United States, without payment to me of any royalty thereon.

This invention consists of a process of treating fruit, particularly citrus fruit, to prevent decay caused by blue and green molds with a solution of cadmium sulphate, the chemical formula for which is $3CdSO_4 8H_2O$ in water at low concentration, a concentration of 1 part to 400 up to 2 parts to 100 by weight being preferred. The solution may be used either alone or in combination with cadmium chloride, the chemical formula of which is $CdCl_2 2H_2O$ in concentration of 1 part by weight to 400 parts of water or of the solution of cadmium sulphate to 2 parts by weight to 100 parts of the solution of cadmium sulphate mentioned above.

The solution of cadmium sulphate at concentrations of 1 part to 400 up to 2 parts to 100 has been found to be efficient in the control of blue mold decay caused by *Penicillium italicum* while a solution of cadmium chloride at concentrations of 1 part to 400 up to 2 parts to 100 is efficient in controlling the decay of citrus fruit caused by *Penicillium digitatum*. The treatments can therefore well be combined by mixing the solutions and the treatment to prevent decay caused by both these fungi can then be made at one time. The concentrations of cadmium chloride and cadmium sulphate to be used depends somewhat upon the vigor of the fruit and the character of the injury of the rind. Ordinarily a concentration of one-half per cent cadmium sulphate with one per cent cadmium chloride in the solution will give adequate control of both blue and green mold decay.

The material as ordinarily procured may be put directly into the water in the treating tank or may be dissolved separately in water before placing in the tank. I do not desire to limit the temperature of the treating solution to any set temperature as various temperatures from 60° F. upward have proven effective. Neither do I desire to limit the time required for the treatment as good results have been obtained in the control of these fungi with treatment of three minutes duration while treatments up to eight or even ten minutes on tender fruit do not necessarily injure the fruit. For young and vigorous fruit a thorough wetting of the rind which can be done in two or three minutes is sufficient to give effective control of blue and green mold decay while over-ripe or old fruit may require as much as ten minutes to render the rind resistant to the fungi. The treatment above described is accomplished by spraying, submerging, immersing, or causing the fruit to pass through a receptacle or tank containing the solution of cadmium sulphate and cadmium chloride in such a manner that the entire surface of the fruit is wet with the solution. The apparatus described by Barger, Hukill and Hawkins, in United States Patent No. 1,559,733 may be used for this purpose. The treating solution may be applied to the fruit immediately prior to the time of washing, during the washing process, or as a treatment on clean fruit without the other washing. The fruit may be sprayed as it leaves the treating solution with water or a dilute solution of the fungicide to remove excessive deposits of the salts without lessening the effectiveness of the treatment.

I claim:—

A process of treating fresh fruits, especially citrus fruit, with a solution of cadmium sulphate in proportions of one part by weight to two hundred parts of water up to four parts by weight to one hundred parts of water in a mixture of cadmium chloride in the proportions of one part by weight of cadmium chloride to two hundred parts of the solution of cadmium sulphate up to four parts by weight of cadmium chloride to one hundred parts of the solution of cadmium sulphate to prevent decay in such fruits caused by *Penicillium digitatum* and *Penicillium italicum*.

WILLIAM R. BARGER.